United States Patent
Byun et al.

(10) Patent No.: US 9,178,199 B2
(45) Date of Patent: Nov. 3, 2015

(54) LITHIUM BATTERY

(75) Inventors: In-Seop Byun, Yongin-si (KR);
Young-Bae Sohn, Yongin-si (KR);
Kyeong-Min Jeong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 620 days.

(21) Appl. No.: 13/557,137

(22) Filed: Jul. 24, 2012

(65) Prior Publication Data

US 2013/0216891 A1   Aug. 22, 2013

Related U.S. Application Data

(60) Provisional application No. 61/601,373, filed on Feb. 21, 2012.

(51) Int. Cl.

| | |
|---|---|
| *H01M 2/16* | (2006.01) |
| *C08F 20/06* | (2006.01) |
| *C08F 118/02* | (2006.01) |
| *C08F 114/08* | (2006.01) |
| *C08F 14/06* | (2006.01) |
| *C08F 210/00* | (2006.01) |
| *C08F 10/00* | (2006.01) |
| *H01M 4/13* | (2010.01) |
| *H01M 4/62* | (2006.01) |

(52) U.S. Cl.
CPC ................ *H01M 2/16* (2013.01); *H01M 2/168* (2013.01); *H01M 2/1673* (2013.01); *H01M 2/1686* (2013.01); *H01M 4/13* (2013.01); *H01M 4/622* (2013.01); *H01M 4/623* (2013.01); *Y02E 60/122* (2013.01)

(58) Field of Classification Search
CPC ... H01M 2/16; H01M 2/1673; H01M 2/1686; H01M 4/622; H01M 4/623; H01M 2/168; H01M 4/13; Y02E 60/122

USPC ............ 429/144, 246, 251, 252; 526/317.1, 526/319, 343, 344, 348, 348.1

See application file for complete search history.

(56) References Cited

U.S. PATENT DOCUMENTS

| | | | |
|---|---|---|---|
| 2002/0177041 A1 | 11/2002 | Wohrie et al. | |
| 2006/0216601 A1 | 9/2006 | Komiyama et al. | |
| 2007/0048602 A1 * | 3/2007 | Kim .............................. | 429/144 |

(Continued)

FOREIGN PATENT DOCUMENTS

| | | |
|---|---|---|
| EP | 0 991 132 A2 | 4/2000 |
| EP | 1 261 048 A2 | 11/2002 |

(Continued)

OTHER PUBLICATIONS

English Machine Translation of JP 10-302799, dated Nov. 13, 1998, 32 pages.

(Continued)

*Primary Examiner* — William Cheung
(74) *Attorney, Agent, or Firm* — Christie, Parker & Hale, LLP

(57) ABSTRACT

A lithium battery including a positive electrode; a negative electrode including a negative active material layer including a first aqueous binder and a second aqueous binder, the first aqueous binder including a monomer unit; and a separator between the positive electrode and the negative electrode, the separator including a base material layer and a polymer layer formed on at least one surface of the base material layer, and the polymer layer including a non-aqueous binder including a monomer unit identical to the monomer unit of the first aqueous binder is disclosed.

20 Claims, 1 Drawing Sheet

(56) References Cited

U.S. PATENT DOCUMENTS

| | | |
|---|---|---|
| 2009/0152509 A1 | 6/2009 | Choi et al. |
| 2011/0143198 A1 | 6/2011 | Choi et al. |

FOREIGN PATENT DOCUMENTS

| | | |
|---|---|---|
| JP | 10-302799 | 11/1998 |
| KR | 10-2006-0097630 | 9/2006 |
| KR | 10-2008-0018732 A | 2/2008 |
| KR | 10-2009-0066022 | 6/2009 |
| KR | 10-2011-0066592 | 6/2011 |
| WO | WO 99/09604 A1 | 2/1999 |

OTHER PUBLICATIONS

EPO Search Report dated May 27, 2013, for corresponding European Patent application 12179388.9, (7 pages).

* cited by examiner

LITHIUM BATTERY

CROSS-REFERENCE TO RELATED APPLICATION

This application claims priority to and the benefit of U.S. Provisional Application No. 61/601,373, filed on Feb. 21, 2012, in the United States Patent and Trademark Office, the disclosure of which is incorporated herein in its entirety by reference.

BACKGROUND

1. Field

Aspects of embodiments of the present invention relate to a lithium battery.

2. Description of the Related Art

To comply with a demand for small and high-performance devices, it is important to manufacture small and light-weight lithium batteries. Also, for use in electric vehicles, discharging capacity, energy density, and cycle characteristics of lithium batteries are taken into consideration as important factors. For use in such appliances, lithium batteries with a large discharging capacity and high energy density per unit volume, and excellent lifespan characteristics are required.

A separator is included in a lithium battery to prevent or reduce short-circuiting between a positive electrode and a negative electrode. An organic-based separator melts at a temperature of 200° C. or less. Accordingly, when the temperature of a battery including the organic-based separator is increased due to internal and/or external stimuli, a volumetric change may occur due to shrinking or melting of the separator, and thus, the operation of a battery is stopped.

A typical separator has low adhesion with an electrode. Accordingly, during charging and discharging, the distance between electrodes may increase, and thus, the degree of expansion is substantially increased. Due to the increase in a volume of the battery, the capacity and energy density of the battery per unit volume may be reduced. The substantial volumetric change of the battery may lead to destruction of the separator. Accordingly, lifespan characteristics of a lithium battery including the separator may be decreased.

Thus, there is a need to develop a lithium battery that has a reduced volumetric change resulting from improved adhesion property between a separator and an electrode and improved lifespan characteristics.

SUMMARY

Aspects of embodiments of the present invention provide a lithium battery with improved adhesion between a separator and an electrode.

According to an embodiment of the present invention, a lithium battery includes a positive electrode; a negative electrode including a negative active material layer including a first aqueous binder and a second aqueous binder, the first aqueous binder including a monomer unit; and a separator between the positive electrode and the negative electrode, the separator including a base material layer and a polymer layer formed on at least one surface of the base material layer, the polymer layer including a non-aqueous binder including a monomer unit identical to the monomer unit of the first aqueous binder.

In one embodiment, the monomer unit of the first aqueous binder includes at least one selected from the group consisting of a diene-based monomer unit, an acryl-based monomer unit, a fluorine-based monomer unit, and a silicon-based monomer unit.

The monomer unit of the first aqueous binder may include at least one selected from the group consisting of a butadiene monomer unit, an isoprene monomer unit, an acrylate ester monomer unit, a methacrylate ester monomer unit, a vinylidenefluoride monomer unit, a tetrafluoroethylene monomer unit, a hexafluoropropylene monomer unit, and a siloxane monomer unit.

In one embodiment, the first aqueous binder includes a copolymer of the vinylidenefluoride-based monomer and at least one monomer selected from the group consisting of tetrafluoroethylene and hexafluoropropylene.

The first aqueous binder may include a vinylidenefluoride-hexafluoropropylene copolymer.

In one embodiment, the first aqueous binder further includes an olefin-based monomer selected from the group consisting of ethylene, propylene, butene, butadiene, isoprene, and pentene.

In one embodiment, the first aqueous binder further includes a hydrophilic group selected from the group consisting of a carboxylic acid group, a hydroxyl group, and a sulfonic acid group.

The second aqueous binder may be different from the first aqueous binder.

In one embodiment, the second aqueous binder includes at least one selected from the group consisting of styrene-butadiene rubber, acrylated styrene-butadiene rubber, acrylonitrile-butadiene rubber, acrylonitrile-butadiene-styrene rubber, acryl rubber, butyl rubber, fluorine rubber, polytetrafluoroethylene, polyethylene, polypropylene, ethylenepropylene copolymer, polyethylene oxide, polyvinylpyrrolidone, polyepichlorohydrin, polyphosphazene, polyacrylonitrile, polystyrene, ethylenepropylenediene copolymer, polyvinylpyridine, chlorosulfonated polyethylene, latex, a polyester resin, an acryl resin, a phenol resin, an epoxy resin, polyvinylalcohol, hydroxypropylmethylcellulose, hydroxypropylcellulose, and diacetylcellulose.

In one embodiment, the first aqueous binder and the second aqueous binder are present in the negative active material layer at a weight ratio in a range of 0.1:1 to 10:1.

The first aqueous binder and the second aqueous binder may be present in the negative active material layer at a weight ratio in a range of 0.25:1 to 10:1.

In one embodiment, the first aqueous binder is present in the negative active material layer in an amount in a range of 0.01 wt % to 10 wt %.

The first aqueous binder may be present in the negative active material layer in an amount in a range of 0.01 wt % to 5 wt %.

In one embodiment, the polymer layer includes two layers, each polymer layer being on opposite surfaces of the base material layer.

In one embodiment, the base material layer is a porous film comprising a polyolefin material.

In one embodiment, the non-aqueous binder of the polymer layer includes at least one selected from the group consisting of polyethylene, polypropylene, polyisobutylene, polyvinyl chloride, polyvinylidene chloride, polyvinylidene fluoride, polytetrafluoroethylene, polyvinyl acetate, polyvinylalcohol, polyvinylisobutylether, polyacrylonitrile, polymethacrylonitrile, methyl polymethacrylate, methyl polyacrylate, ethyl polymethacrylate, allyl acetate, polystyrene, polybutadiene, polyisoprene, polyoxymethylene, polyoxyethylene, poly cyclothioether, polydimethylsiloxane, polylactone, polyethyleneterephthalate, polycarbonate, nylon 6, nylon 66, polym-phenyleneisophthalamide, poly-p-phenyleneterephthalamide, and polypyromellitimide.

In one embodiment, the polymer layer has a thickness in a range of 0.1 μm to 10 μm.

In one embodiment, the positive electrode includes a binder including a monomer unit identical to the monomer unit of the first aqueous binder of the negative electrode.

In one embodiment, the positive electrode includes a binder identical to the non-aqueous binder of the separator.

In one embodiment, the positive electrode includes a binder identical to the first aqueous binder of the negative electrode.

According to an aspects of embodiments of the present invention, due to the use of the separator having at least one surface on which the above-described polymer layer is formed and two or more of the above-described aqueous binders, adhesion between the separator and the electrode is improved and, thus, the formed lithium battery including the electrode and the separator may have improved lifespan characteristics.

BRIEF DESCRIPTION OF THE DRAWINGS

The accompanying drawings, together with the specification, illustrate exemplary embodiments of the present invention, and, together with the description, serve to explain principles of the present invention.

DETAILED DESCRIPTION

Figure 1:
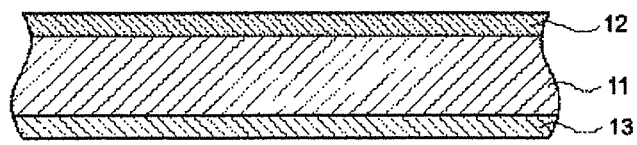
FIG. 1 is a schematic view of an example of a separator according to one embodiment of the invention.

In the following detailed description, only certain embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Hereinafter, lithium batteries according to exemplary embodiments of the present invention are described.

A lithium battery according to an embodiment of the present invention includes a positive electrode; a negative electrode including a negative active material layer including a first aqueous binder and a second aqueous binder, the first aqueous binder including a monomer unit; and a separator between the positive electrode and the negative electrode, the separator including a base material layer and a polymer layer formed on at least one surface of the base material layer, and the polymer layer including a non-aqueous binder including a monomer unit identical to the monomer unit of the first aqueous binder.

Due to the use of the negative electrode including an aqueous binder that includes the same monomer unit as in the non-aqueous binder of the separator that includes the polymer layer formed on at least one surface of the base material layer, adhesion between the negative electrode and the separator is improved and, thus, resistance of an electrode plate is reduced and charging and discharging characteristics of a lithium battery may be improved, and also, a volumetric change of a lithium battery during charging and discharging may be suppressed. That is, by including a negative electrode including a negative active material including a first aqueous binder including a monomer unit, and a separator including a polymer layer including a monomer unit identical to the monomer unit of the first aqueous binder, a battery according to embodiments of the invention may have reduced electrode resistance of an electrode plate, improved charging and discharging characteristics, and volumetric change of the battery during charging and discharging may be suppressed.

Also, because the negative electrode included in the lithium battery is manufactured by using water instead of an organic solvent, the manufacturing process is simple and environmentally friendly, and the manufacturing costs are low.

The first aqueous binder of the negative electrode of the lithium battery may include at least one selected from the group consisting of a diene-based monomer unit, an acryl-based monomer unit, a fluorine-based monomer unit, and a silicon-based monomer unit. The first aqueous binder may be either in an aqueous dispersion form in which a polymer including the monomer unit is dispersed in water or in an aqueous solution form in which a polymer is dissolved in water, but it is not limited to these forms and any of various suitable forms that are available in the art may be used herein.

For example, the first aqueous binder may include at least one selected from the group consisting of a butadiene monomer unit, an isoprene monomer unit, an acrylate ester monomer unit, a methacrylate ester monomer unit, a vinylidenefluoride monomer unit, a tetrafluoroethylene monomer unit, a hexafluoropropylene monomer unit, and a siloxane monomer unit.

For example, the first aqueous binder may include a copolymer, such as a copolymer of a vinylidenefluoride-based monomer and at least one monomer selected from the group consisting of tetrafluoroethylene and hexafluoropropylene.

The copolymer may additionally include an olefin-based monomer (e.g., in addition to the fluorine-based monomer). The olefin-based monomer included in the copolymer may include at least one selected from the group consisting of ethylene, propylene, butene, butadiene, isoprene, and pentene, but it is not limited thereto and any suitable olefin-based monomers that are known in the art may be used herein.

Also, the copolymer may additionally include a hydrophilic group selected from the group consisting of a carboxylic acid group, a hydroxyl group, and a sulfonic acid group, but the hydrophilic group is not limited thereto and any suitable hydrophilic groups that are known in the art may be used herein. For example, the copolymer may include a cationic hydrophilic group, a non-ionic hydrophilic group, and an amphoteric hydrophilic group. Due to the additional inclusion of the hydrophilic group in the copolymer, a water dispersion property may be further enhanced. In one embodiment, the amount of the hydrophilic group included in the copolymer is an amount of a monomer including the hydrophilic group during polymerization, and may be in a range of 0.1 to 40 wt % based on the total weight of the monomer. For example, the amount of the hydrophilic group may be in a range of 0.5 to 20 wt %. Within this amount range, dispersibility of the copolymer may be further increased.

The second aqueous binder may include at least one selected from the group consisting of styrene-butadiene rubber, acrylated styrene-butadiene rubber, acrylonitrile-butadiene rubber, acrylonitrile-butadiene-styrene rubber, acryl rubber, butyl rubber, fluorine rubber, polytetrafluoroethylene, polyethylene, polypropylene, ethylenepropylene copolymer, polyethylene oxide, polyvinylpyrrolidone, polyepichlorohydrin, polyphosphazene, polyacrylonitrile, polystyrene, ethylenepropylenediene copolymer, polyvinylpyridine, chlorosulfonated polyethylene, latex, a polyester resin, an acryl resin, a phenol resin, an epoxy resin, polyvinylalcohol, hydroxypropylmethylcellulose, hydroxypropylcellulose, and diacetylcellulose, but it is not limited thereto and any suitable binders that have a structure different from that of the first aqueous binder and are known in the art may be used herein.

The first aqueous binder and the second aqueous binder included in the lithium battery may be mixed at a weight ratio of 0.1:1 to 10:1. For example, the first aqueous binder and the second aqueous binder may be mixed at a weight ratio of 0.25:1 to 10:1. For example, the first aqueous binder and the second aqueous binder may be mixed at a weight ratio of 0.25:1 to 5:1. In one embodiment, when the weight ratio is less than 0.1:1, the adhesion force is decreased. For example, when only the second aqueous binder is used, the adhesion force between a separator and an active material layer is weak and thus, they may become separated from each other. On the other hand, in another embodiment, when the weight ratio is greater than 10:1, the energy density of a battery is reduced and the adhesion force with a separator is reduced. For example, when only the first aqueous binder is used, an adhesion force between a negative electrode substrate and an active material layer may be weak and, thus, they may become separated from each other.

The amount of the first aqueous binder included in the negative active material layer in the lithium battery may be, based on a total amount of a negative active material layer, in a range of 0.01 wt % to 10 wt %. For example, the amount of the first aqueous binder may be in a range of 0.01 wt % to 5 wt % based on the total amount of the negative active material layer. For example, the amount of the first aqueous binder may be in a range of 0.05 wt % to 5 wt %, based on the total amount of the negative active material layer. For example, the amount of the first aqueous binder may be in a range of 0.01 wt % to 3 wt % based on the total amount of the negative active material layer. For example, the amount of the first aqueous binder may be in a range of 0.01 wt % to 1 wt % based on the total amount of the negative active material layer. In one embodiment, when the amount of the first aqueous binder is less than 0.01 wt %, the adhesion force with respect to the separator is reduced; and, in another embodiment, when the amount of the first aqueous binder is greater than 10 wt %, the energy density of a battery is reduced.

The separator included in the lithium battery may include, for example, as illustrated in FIG. 1, a base material layer 11 and polymer layers 12 and 13 formed on surfaces of the base material layer.

The polymer layer includes a non-aqueous binder having the same monomer structure as that in the first aqueous binder included in the negative electrode. Thus, adhesion of the separator with the negative electrode may be enhanced.

The non-aqueous binder included in the polymer layer may include at least one selected from the group consisting of polyethylene, polypropylene, polyisobutylene, polyvinyl chloride, polyvinylidene chloride, polyvinylidene fluoride, polytetrafluoroethylene, polyvinyl acetate, polyvinylalcohol, polyvinylisobutylether, polyacrylonitrile, polymethaacrylonitrile, methyl polymethacrylate, methyl polyacrylate, ethyl polymethacrylate, allyl acetate, polystyrene, polybutadiene, polyisoprene, polyoxymethylene, polyoxyethylene, polycyclothioether, polydimethylsiloxane, polylactone, polyethyleneterephthalate, polycarbonate, nylon 6, nylon 66, poly-m-phenyleneisophthalamide, poly-p-phenyleneterephthalamide, and polypyromellitimide, but it is not limited thereto, and any suitable non-aqueous binders that are known in the art may be used herein.

The thickness of the polymer layer of the separator may be in a range of 0.1 μm to 10 μm. For example, the thickness of the polymer layer may be in a range of 0.5 μm to 8 μm. In one embodiment, when the polymer layer is too thin, the adhesion force between the separator and the negative electrode is reduced; and, in another embodiment, when the polymer layer is too thick, resistance of a battery including the polymer layer is increased.

The base material layer of the separator may be an organic layer. The base material layer may be a porous film that does not have electron conductivity, has ionic conductivity, has high durability with respect to an organic solvent, and has fine pore diameters. The thickness of the base material layer may be, for example, in a range of 0.5 to 40 μm, or 1 to 30 μm, or 1 to 10 μm. In one embodiment, when the base material layer has such thickness ranges, separator-induced resistance of a battery is reduced and also, during coating on the separator, workability is improved.

The base material layer of the separator may be a porous film including polyolefin. Polyolefin has excellent short-circuiting prevention or reduction effects and also, may improve stability of a battery due to a shut-down effect. For example, the base material layer may be a porous film that includes polyolefin, such as polyethylene, polypropylene, polybutene, or polyvinyl chloride, or a combination or copolymer thereof, but it is not limited thereto and any suitable porous films that are known in the art may be used herein. For example, a porous film that is composed of a resin (such as polyethyleneterephthalate, polycycloolefin, polyethersulfone, polyamide, polyimide, polyimideamide, polyaramide, polycycloolefin, nylon, polytetrafluoroethylene, or the like); a porous film formed by weaving polyolefin-based fiber; a non-woven fabric including polyolefin; an assembly of insulating material particles; or the like may be used. For example, a porous film including polyolefin may allow a polymer slurry for preparing the polymer layer formed on the base material layer to have excellent coating properties and may enable the preparation of a thin separator film to increase the ratio of an active material in a battery and the capacity per volume.

For example, the polyolefin used as a material for forming the base material layer may be a homopolymer, a copolymer, or a mixture of polyethylene, polypropylene, or the like. Polyethylene may be low-density, middle-density, or high-density polyethylene, and in consideration of mechanical strength, high-density polyethylene may be used. Also, two or more kinds of polyethylene may be used to provide flexibility. The polymerization catalyst that is used in preparing polyethylene may not be limited, and a Ziegler-Natta based catalyst, or a Philips-based catalyst, or a metallocene catalyst, or the like may be used. To simultaneously obtain mechanical strength and high permeation properties, the weight average molecular amount of polyethylene may be in a range of 0.1 million to 12 million, for example, 0.2 million to 3 million. The polypropylene may be a homopolymer, a random copolymer, a block copolymer, or a combination thereof. Also, the polymerization catalyst may not be limited, and a Ziegler-Natta based catalyst, a metallocene catalyst, or the like may be used as the polymerization catalyst. Also, tacticity is not limited, and isotactic, syndiotactic, or atactic may be used, and for example, relatively inexpensive isotactic polypropylene may be used. Also, as long as the effects of the present invention are not impaired, polyolefins other than polyethylene and polypropylene, an antioxidant, or the like may be further used.

The negative electrode of the lithium battery may include a carbonaceous negative active material. The carbonaceous negative active material may be crystalline carbon, non-crystalline carbon, or a mixture thereof. The crystalline carbon may be natural or artificial graphite in an amorphous, tabular, flake-like, spherical, or fibrous form, and the non-crystalline carbon may be soft carbon (low temperature calcined carbon), hard carbon, mesophase pitch carbide, calcined corks, or the like, but it is not limited thereto, and any suitable carbonaceous negative active materials that are known in the art may be used herein.

The positive electrode of the lithium battery may include the same non-aqueous binder as in the polymer layer of the separator. Due to the inclusion of the same non-aqueous binder of the positive electrode and the separator, adhesion between the positive electrode and the separator may be improved.

Alternatively, the positive electrode of the lithium battery may include the same aqueous binder as in the negative electrode. Due to the inclusion of an aqueous binder that includes the same monomer unit as in the separator, adhesion between the positive electrode and the separator may be improved.

For example, the lithium battery may be manufactured by using the following method.

First, the positive electrode is prepared.

For example, a positive active material, a conductive material, a binder, and a solvent are mixed to prepare a positive active material composition. The positive active material composition is directly coated on a metal current collector to prepare a positive electrode plate. Alternatively, the positive active material composition may be cast on a separate support, and then a film separated from the support may be laminated on a metal current collector to complete the preparation of a positive electrode plate. The positive electrode may also be manufactured by using other methods.

As the positive active material, any suitable lithium-containing metal oxides that are known in the art may be used herein without limitation. For example, at least one of a composite oxide including lithium and metal selected from cobalt, manganese, nickel, and a combination thereof may be used, and examples thereof include compounds represented by any one of $Li_aA_{1-b}B_bD_2$ (where $0.90 \leq a \leq 1.8$, and $0 \leq b \leq 0.5$); $Li_aE_{1-b}B_bO_{2-c}D_c$ (where $0.90 \leq a \leq 1.8$, $0 \leq b \leq 0.5$, and $0 \leq c \leq 0.05$); $LiE_{2-b}B_bO_{4-c}D_c$ (where $0 \leq b \leq 0.5$, and $0 \leq c \leq 0.05$); $Li_aNi_{1-b-c}Co_bB_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB_cO_{2-\alpha}F_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_2$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2G_bO_4$ (where $0.90 \leq a \leq 1.8$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$:

In the formulae above, A is Ni, Co, Mn, or a combination thereof; B is Al, Ni, Co, Mn, Cr, Fe, Mg, Sr, V, a rare-earth element or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

For example, the lithium-containing metal oxide may be $LiCoO_2$, $LiMn_xO_{2x}$ (x=1, 2), $LiNi_{1-x}Mn_xO_{2x}$ ($0<x<1$), $Ni_{1-x-y}Co_xMn_yO_2$ ($0 \leq x \leq 0.5$, $0 \leq y \leq 0.5$), $LiFePO_4$, or the like.

Also, these compounds may have a coating layer on their surfaces, or these compounds may be mixed with a compound including a coating layer. The coating layer may include a coating element compound, such as an oxide or hydroxide of the coating element, an oxyhydroxide of the coating element, oxycarbonate of the coating element, or a hydroxycarbonate of the coating element. These compounds that constitute the coating layers may be non-crystalline or crystalline. As the coating element included in the coating layer, Mg, Al, Co, K, Na, Ca, Si, Ti, V, Sn, Ge, Ga, B, As, Zr, or a mixture thereof may be used. A process for forming the coating layer may be any one of various coating methods (for example, spray coating, immersion, or the like) that use these compounds and these elements and do not adversely affect physical properties of the positive active material. These coating methods are known to one of ordinary skill in the art and thus, are not described in further detail herein.

The conductive material may be carbon black or graphite particles, but is not limited thereto, and any suitable conductive materials that are known in the art may be used herein.

Examples of the binder are a vinylidene fluoride/hexafluoropropylene copolymer, polyvinylidenefluoride(PVDF), polyacrylonitrile, polymethylmethacrylate, polytetrafluoroethylene, and a mixture thereof, and a styrene butadiene rubber-based polymer, but are not limited thereto, and any one of various binders that are available in the art may be used herein.

For example, as the binder, the same non-aqueous binder as in the polymer layer of the separator may be used, or the same aqueous binder as in the negative electrode may be used.

Examples of the solvent are N-methylpyrrolidone, acetone, and water, but are not limited thereto, and any suitable materials that are known in the art may be used herein.

Amounts of the positive active material, the conductive material, the binder, and the solvent may be included at the same levels as used in a typical lithium battery. According to the purpose or structure of a lithium battery, at least one of the conductive material, the binder, and the solvent may be omitted.

Next, the negative electrode is prepared.

For example, a negative active material, a conductive material, two or more aqueous binders, and a solvent are mixed to prepare a negative active material composition. The negative active material composition is directly coated and dried on a metal current collector to prepare a negative electrode plate. Alternatively, the negative active material composition may be cast on a separate support, and then a film separated from the support is laminated on a metal current collector to complete the preparation of a negative electrode plate.

The negative active material may be a carbonaceous material as described above, but is not limited thereto, and any one of various materials that are used as a negative active material for a lithium battery is used herein. For example, the negative active material may include at least one selected from the group consisting of lithium metal, a metal that is alloyable with lithium, a transition metal oxide, a non-transition metal oxide, and a carbonaceous material.

For example, the metal that is alloyable with lithium may be Si, Sn, Al, Ge, Pb, Bi, Sb, Si—Y alloy (where Y is an alkali metal, an alkali earth metal, a Group 13 element, a Group 14 element, a transition metal, a rare-earth element, or a combination thereof and is not Si), Sn—Y alloy (the Y is an alkali metal, an alkali earth metal, a Group 13 element, a Group 14 element, transition metal, a rare-earth element, or a combination thereof and is not Sn), or the like. The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

For example, the transition metal oxide may be a lithium titanium oxide, a vanadium oxide, a lithium vanadium oxide, or the like.

For example, the non-transition metal oxide may be $SnO_2$, $SiO_x$ (0<x<2), or the like.

The conductive material used in the negative active material composition may be the same as that in the positive active material composition. In the negative active material composition, the binder includes two or more aqueous binders as described above and the solvent is water. Also, a plasticizer may be further added to the positive active material composition and/or negative active material composition to form pores inside an electrode plate.

Amounts of the negative active material, the conductive material, the binder, and the solvent may be may be included at the same levels as used in a typical lithium battery. According to the purpose or structure of a lithium battery, at least one of the conductive material, the binder, and the solvent may be omitted.

Subsequently, the separator is prepared.

The separator, as described above, includes the base material layer and the polymer layer disposed on one or two surfaces of the base material layer.

The base material layer may be formed by using known and available methods. For example, the base material layer may be formed by using a dry method as follows: polypropylene and polyethylene are molten and extruded to form a film, followed by annealing at low temperature and growing a crystal domain, and in this state, elongation is performed thereon to extend a non-crystalline region to form a microporous film. Alternatively, the base material layer may be formed by using a wet method as follows: small molecular materials, such as a hydrocarbon solvent, are mixed with polypropylene and polyethylene to form a film, and subsequently, a non-crystalline island phase is formed within the film by gathering of a solvent or small molecules, and then the island phase is removed by extracting the solvent and small molecules with other volatile solvents to form a microporous film.

For the purpose of controlling strength, hardness, or a thermal shrinking rate, the base material layer may include non-conductive particles, other different fillers, a fiber compound, or the like. Also, to improve adhesion with the polymer layer or to decrease surface tension with an electrolyte to improve impregnation properties, when the polymer layer is deposited on the base material layer, the base material layer in advance may be surface-treated with a small molecular compound or a polymer compound, and the base material layer may also be treated with an electronic ray, such as an ultraviolet ray, or may be subjected to a plasma treatment using a corona discharge plasma gas. For example, optionally, a polymer compound including a polar group, such as a carboxylic acid group, a hydroxyl group, a sulfonic acid group, or the like, may be treated on the base material layer, because the polymer compound has high impregnation properties of an electrolytic solution and high adhesion with a porous film including non-conductive particles and a binder.

For the purpose of increasing tear strength or mechanical strength, the base material layer may have a multi-layer structure including at least one base material layer. In more detail, the base material layer may be a stack including a polyethylene microporous film and a polypropylene microporous film, a stack including a non-woven fabric and a polyolefin-based separator, or the like.

The polymer layer formed on one or two surfaces of the base material layer may be a porous film including a non-aqueous binder. The porous film structure of the polymer layer may provide excellent impregnation properties of an electrolytic solution and high ion permeation properties.

The polymer layer may be formed by using known and available methods. For example, a slurry including a non-aqueous binder and N-methylpyrrolidone (NMP) is prepared and then, the slurry is coated on the base material layer and then, the resultant is passed through a bath including a solvent that is a non solvent or poor solvent with respect to the non-aqueous binder and has affinity to NMP so as to allow phase change to occur, followed by drying to form a porous polymer layer.

Through this method, a polymer layer is formed by rapid organic phase separation of the non-solvent or poor solvent, and resin backbones are connected to each other to form a fine three-dimensional porous structure. That is, by contacting a solution in which a non-aqueous binder is dissolved with a solvent that is a non-solvent or poor solvent with respect to the non-aqueous binder and has affinity for NMP that is used to dissolve or disperse the non-aqueous binder, high-speed phase separation may occur and, accordingly, the polymer layer has a 3-dimensional porous mesh structure.

Optionally, the polymer layer may include inorganic particles. Due to the inclusion of the inorganic particles, the separator may have improved antioxidant properties and deterioration of characteristics of a battery may be suppressed. The inorganic particles may include alumina ($Al_2O_3$), silica ($SiO_2$), titania ($TiO_2$), or the like. The average particle size of the inorganic particles may be in a range of 10 nm to 5 µm. When the average particle size of the inorganic particles is less than 10 nm, crystallinity of the inorganic particles may be degraded and, thus, the addition effects of the particles may be negligible; and when the average particle size of the inorganic particles is greater than 5 µm, it is difficult to disperse inorganic particles.

Next, an electrolyte is prepared.

The electrolyte may be in a liquid or gel state. For example, the electrolyte may be an organic electrolytic solution. Also, the electrolyte may be solid. For example, the solid electrolyte may be a boron oxide, lithium oxynitride, or the like, but is not limited thereto, and any one of various materials that are used as a solid electrolyte in the art may be used herein. The solid electrolyte may be formed on the negative electrode by, for example, sputtering.

For example, an organic electrolytic solution is prepared. An organic electrolytic solution may be prepared by dissolving a lithium salt in an organic solvent.

The organic solvent may be any suitable organic solvents that are known in the art. For example, the organic solvent may be propylene carbonate, ethylene carbonate, fluoroethylene carbonate, diethyl carbonate, methylethyl carbonate, methylpropyl carbonate, butylene carbonate, benzonitrile, acetonitrile, tetrahydrofurane, 2-methyltetrahydrofurane, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, dimethylcarbonate, methylisopropylcarbonate, ethylpropylcarbonate, dipropylcarbonate, dibutylcarbonate, diethyleneglycol, dimethylether, a mixture thereof, or the like.

The lithium salt may be any one of various lithium salts that are available in the art. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}$ $SO_2)(C_yF_{2y+1}SO_2)$ (where x and y are natural numbers), LiCl, LiI, a mixture thereof, or the like.

Figure 2:
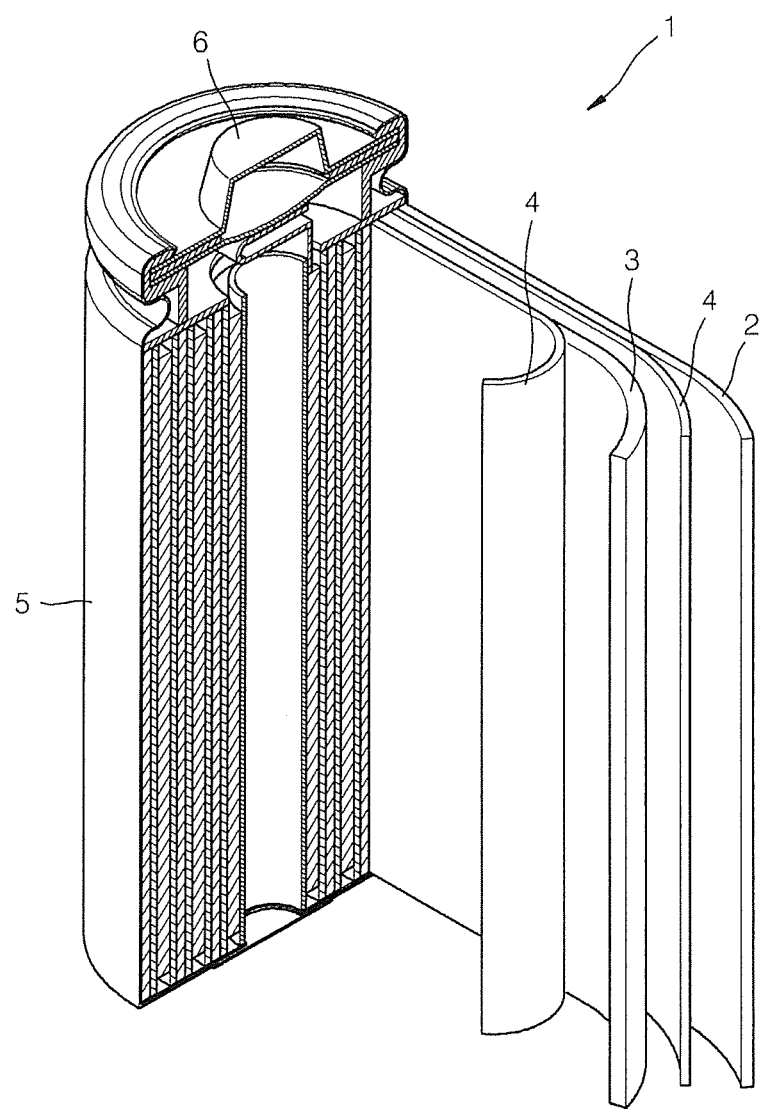
FIG. 2 is a schematic view of an example of a lithium battery according to one embodiment of the invention.

Referring to FIG. 2, a lithium battery 1 includes a positive electrode 3, a negative electrode 2, and a separator 4. The positive electrode 3, the negative electrode 2, and the separator 4 are wound or folded to be placed in a battery case 5. Then, an organic electrolytic solution is injected to the battery case 5, followed by sealing with a cap assembly 6, thereby completing the manufacture of the lithium battery 1. The battery case 5 may be cylindrical or rectangular, or may have a thin-film shape. For example, the lithium battery 1 may be a thin film battery. Alternatively, the lithium battery 1 may be a lithium ion battery.

The separator may be placed between the positive electrode and the negative electrode to form a battery assembly. In one embodiment, a plurality of battery assemblies are stacked in a bi-cell structure, and impregnated with an organic electrolytic solution, and the obtained result is housed in a pouch and sealed, thereby completing the manufacture of a lithium ion polymer battery.

Also, a plurality of battery assemblies may be stacked to form a battery pack, and the battery pack may be used in devices requiring high capacity and high power output. For example, the battery pack may be used in a notebook computer, a smartphone, an electric vehicle (EV), or the like.

The present invention is described in more detail with reference to the Examples presented below. However, these examples are used for illustrative purpose only and do not restrict the scope of the present invention.

Manufacturing of Negative Electrode

Preparation Example 1

0.25 parts by weight of an olefin-based vinylidenefluoride-hexafluoropropylene copolymer as a first aqueous binder, 1 part by weight of styrene-butadiene rubber (SBR) as a second aqueous binder, 1 part by weight of carboxymethylcellulose (CMC) as a thickener, and 97.75 parts by weight of graphite particles (MAG-4V, Japan Chemistry) having an average particle size of 25 μm were mixed to prepare 100 parts by weight of a mixed material of an active material and a binder.

200 parts by weight of distilled water and 15 parts by weight of a carbonaceous conductive material (SFG6, Timcal Inc.) were mixed with the mixed material, followed by stirring using a mechanical stirrer for 60 minutes to prepare a slurry. The slurry was coated to a thickness of about 60 μm on a copper current collector having a thickness of about 15 μm by using a doctor blade, dried in a hot air stream drier at a temperature of 100° C. for 2 hours and dried at a temperature of 120° C. for 2 hours to complete the preparation of a negative electrode plate.

Preparation Example 2

A negative electrode was prepared in the same manner as in Preparation Example 1, except that the amount of the first aqueous binder was 0.5 parts by weight and the amount of the graphite particles was 97.5 parts by weight.

Preparation Example 3

A negative electrode was prepared in the same manner as in Preparation Example 1, except that the amount of the first aqueous binder was 1.0 parts by weight and the amount of the graphite particles was 97.0 parts by weight.

Preparation Example 4

A negative electrode was prepared in the same manner as in Preparation Example 1, except that the amount of the first aqueous binder was 2.0 parts by weight and the amount of the graphite particles was 96.0 parts by weight.

Preparation Example 5

A negative electrode was prepared in the same manner as in Preparation Example 1, except that the amount of the first aqueous binder was 5.0 parts by weight and the amount of the graphite particles was 93.0 parts by weight.

Comparative Preparation Example 1

A negative electrode was prepared in the same manner as in Preparation Example 1, except that 3 parts by weight of an olefin-based vinylidenefluoride-hexafluoropropylene copolymer was used as the first aqueous binder, a second aqueous binder was not used, 1 part by weight of carboxymethylcellulose (CMC) was used as a thickener, and the amount of graphite particles was 96.0 parts by weight.

Comparative Preparation Example 2

A negative electrode was prepared in the same manner as in Preparation Example 1, except that 1 part by weight of styrene-butadiene rubber (SBR) was used as the second aqueous binder, 1 part by weight of carboxymethylcellulose (CMC) was used as a thickener, a first aqueous binder was not used, and the amount of graphite particles was 98.0 parts by weight.

Preparation of Separator

Preparation Example 6

10 parts by weight of polyvinylidenefluoride (PVDF, weight average molecular amount 150,000) was added to 90 parts by weight of N-methyl-2-pyrrolidone to prepare a slurry in which 10 wt % polyvinylidenefluoride was dissolved. The slurry was coated on both surfaces of a polyethylene porous film (Asahi, ND509) having a thickness of 9 μm which was used as a base material layer by using a bar coater to form coating layers each having a thickness of 2 μm. The porous film on which the coating layers were formed was placed in a bath and then phase change was performed thereon, followed by drying with a hot air stream, thereby completing the preparation of a separator including a base material layer having surfaces on which a PVDF polymer layer was formed.

Preparation of Lithium Battery

Example 1

A coin cell was manufactured by using the negative electrode plate prepared according to Preparation Example 1, lithium metal as a reference electrode, the separator prepared according to Preparation Example 6, and an electrolyte prepared by dissolving 1.3M $LiPF_6$ in a mixed solution including ethylenecarbonate (EC):ethylmethylcarbonate (EMC):diethylcarbonate (DEC) at a volumetric ratio of 3:5:2.

Example 2

A lithium battery was manufactured in the same manner as in Example 1, except that the negative electrode plate prepared according to Preparation Example 2 was used.

Example 3

A lithium battery was manufactured in the same manner as in Example 1, except that the negative electrode plate prepared according to Preparation Example 3 was used.

Example 4

A lithium battery was manufactured in the same manner as in Example 1, except that the negative electrode plate prepared according to Preparation Example 4 was used.

Example 5

A lithium battery was manufactured in the same manner as in Example 1, except that the negative electrode plate prepared according to Preparation Example 5 was used.

Comparative Example 1

A lithium battery was manufactured in the same manner as in Example 1, except that the negative electrode plate prepared according to Comparative Preparation Example 1 was used.

Comparative Example 2

A lithium battery was manufactured in the same manner as in Example 1, except that the negative electrode plate prepared according to Comparative Preparation Example 2 was used.

Evaluation Example 1

Test on Substrate Adhesion Force Before Impregnation with Electrolytic Solution

The adhesion force of the negative electrode plates prepared according to Preparation Examples 1 to 5 and Comparative Preparation Examples 1 to 2 before being impregnated with the electrolytic solution used in Example 1 was evaluated.

The adhesion force was evaluated through a 180° peel test to measure the adhesion force between a negative electrode material layer and the copper substrate (e.g., the copper current collector) of the negative electrode. In more detail, the pressed negative electrode plate was attached to a slide glass by using a double-sided tape, and a force applied to detach the negative active material layer from the copper substrate at an angle of 180 degrees was measured by using an adhesion force measuring device. The pressing was performed at a temperature of 100° C. with a pressure of 250 kg for 180 seconds.

The substrate adhesion force of the negative electrode (e.g., the adhesion force between the negative active material layer and the substrate) of Comparative Preparation Example 2 was assumed to be 100 and relative substrate adhesion forces of the negative electrodes of Preparation Examples 1-5 and Comparative Preparation Example 1 are shown in Table 1 below.

TABLE 1

| | Substrate adhesion force before impregnation with electrolytic solution |
|---|---|
| Preparation Example 1 | 400 |
| Preparation Example 2 | 550 |
| Preparation Example 3 | 700 |
| Preparation Example 4 | 800 |
| Preparation Example 5 | 1000 |
| Comparative Preparation Example 1 | 250 |
| Comparative Preparation Example 2 | 100 |

As shown in Table 1, compared to Comparative Preparation Example 1 in which only a first aqueous binder was used or Comparative Preparation Example 2 in which only a second aqueous binder was used, Preparation Examples 1 to 5 in which the first aqueous binder and the second aqueous binder were mixed exhibited a substantial increase in the substrate adhesion force of a negative electrode (e.g., adhesion force between the negative active material layer and the substrate) before impregnation with an electrolytic solution.

Evaluation Example 2

Test on Substrate Adhesion Force after Impregnation with Electrolytic Solution

The negative electrode plates prepared according to Preparation Examples 1 to 5 and Comparative Preparation Examples 1 to 2 and the separator prepared according to Preparation Example 6 were pressed to manufacture assemblies, and then the assemblies were impregnated with the electrolytic solution used in Example 1 and adhesion forces thereof were evaluated as in Evaluation Example 1. The pressing was performed at a temperature of 100° C. with a pressure of 250 kg for 180 seconds.

The substrate adhesion force of the negative electrode of Comparative Preparation Example 2 was assumed to be 100 and relative adhesion forces of the negative electrodes of Preparation Examples 1-5 and Comparative Preparation Example 1 are shown in Table 2 below.

TABLE 2

| | Substrate adhesion force after impregnation with electrolytic solution |
|---|---|
| Preparation Example 1 | 182 |
| Preparation Example 2 | 214 |
| Preparation Example 3 | 270 |
| Preparation Example 4 | 400 |
| Preparation Example 5 | 650 |
| Comparative Preparation Example 1 | 170 |
| Comparative Preparation Example 2 | 100 |

As shown in Table 2, compared to Comparative Preparation Example 1 in which only a first aqueous binder was used or Comparative Preparation Example 2 in which only a second aqueous binder was used, Preparation Examples 1 to 5 in which the first aqueous binder and the second aqueous binder were mixed exhibited a substantial increase in the substrate adhesion force of a negative electrode after impregnation with an electrolytic solution.

That is, a battery manufactured using a negative electrode plate according to the Preparation Examples is more suitable for suppression of volumetric change of a battery during charging and discharging than a battery manufactured using a negative electrode plate according to the Comparative Preparation Examples.

Evaluation Example 3

Measurement of Resistance of Negative Electrode Plate

The electrode plate resistance of the negative electrode plates of Preparation Examples 1 to 5 and Comparative Preparation Examples 1 to 2 was measured. To measure the electrode plate resistance, a resistance between two spots on a surface of an electrode plate was measured by using a resistance measuring device (ohmmeter).

The measurement results are shown in Table 3 below.

TABLE 3

|  | electrode plate resistance [Ω] |
| --- | --- |
| Preparation Example 1 | 0.183 |
| Preparation Example 2 | 0.210 |
| Comparative Preparation Example 1 | 0.245 |
| Comparative Preparation Example 2 | 0.224 |

As shown in Table 3, compared to Comparative Preparation Example 1 in which only a first aqueous binder was used or Comparative Preparation Example 2 in which only a second aqueous binder was used, Preparation Examples 1 to 5 in which the first aqueous binder and the second aqueous binder were mixed exhibited a decrease in the resistance of a negative electrode plate.

Evaluation Example 4

Charging and Discharging Test

The coin cells manufactured according to Examples 1 to 5 and Comparative Examples 1 to 2 were charged and discharged once with a constant current of 0.1 C rate in a voltage range of 0.01 to 1.5 V with respect to a lithium metal at a temperature of 25° C. (a formation step).

Subsequently, charging was performed with 0.5 C rate of a constant current and discharging was performed with 0.2 C rate of a constant current (a standard charging and discharging step).

Initial charging and discharging efficiencies and discharge capacities measured in the formation step and the standard charging and discharging step are shown in Table 4 below.

The initial charging and discharging efficiency is obtained by dividing a discharging capacity by a charging capacity in a first cycle in the formation step and then multiplying the result by 100.

TABLE 4

|  | Initial charging and discharging efficiency in formation step [%] | Discharging capacity in formation step [mAh/g] | Discharging capacity in standard charging and discharging step [mAh/g] |
| --- | --- | --- | --- |
| Example 1 | 94.5 | 364 | 367 |
| Example 2 | 94.6 | 370 | 370 |
| Example 3 | 94.7 | 367 | 367 |
| Example 4 | 94.8 | 365 | 365 |
| Example 5 | 94.7 | 364 | 366 |
| Comparative Example 1 | 93.9 | 364 | 366 |
| Comparative Example 2 | 94.5 | 361 | 364 |

As shown in Table 4, a lithium battery according to the Examples overall has higher initial charging and discharging efficiency and discharging capacity than a lithium battery according to the Comparative Examples.

Also, in a separate experiment, the lithium batteries of Examples 1 to 5 showed high-rate characteristics and lifespan characteristics similar to the lithium batteries of Comparative Examples 1 to 2.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

EXPLANATION OF REFERENCE NUMERALS DESIGNATING THE MAJOR ELEMENTS OF THE DRAWINGS

| 1: lithium battery | 2: negative electrode |
| --- | --- |
| 3: positive electrode | 4: separator |
| 5: battery case | 6: cap assembly |
| 11: base material layer | 12, 13: polymer layers |

What is claimed is:

1. A lithium battery comprising:
a positive electrode;
a negative electrode comprising a negative active material layer comprising a first aqueous binder and a second aqueous binder, the first aqueous binder comprising a monomer unit; and
a separator between the positive electrode and the negative electrode, the separator comprising a base material layer and a polymer layer on at least one surface of the base material layer, the polymer layer comprising a non-aqueous binder comprising a monomer unit identical to the monomer unit of the first aqueous binder.

2. The lithium battery of claim 1, wherein the monomer unit of the first aqueous binder comprises at least one selected from the group consisting of a diene-based monomer unit, an acryl-based monomer unit, a fluorine-based monomer unit, and a silicon-based monomer unit.

3. The lithium battery of claim 1, wherein the monomer unit of the first aqueous binder comprises at least one selected from the group consisting of a butadiene monomer unit, an isoprene monomer unit, an acrylate ester monomer unit, a methacrylate ester monomer unit, a vinylidenefluoride monomer unit, a tetrafluoro ethylene monomer unit, a hexafluoropropylene monomer unit, and a siloxane monomer unit.

4. The lithium battery of claim 1, wherein the first aqueous binder comprises a copolymer of a vinylidenefluoride-based monomer and at least one monomer selected from the group consisting of tetrafluoro ethylene and hexafluoropropylene.

5. The lithium battery of claim 4, wherein the first aqueous binder comprises a vinylidenefluoride-hexafluoropropylene copolymer.

6. The lithium battery of claim 4, wherein the first aqueous binder further comprises an olefin-based monomer selected from the group consisting of ethylene, propylene, butene, butadiene, isoprene, and pentene.

7. The lithium battery of claim 4, wherein the first aqueous binder further comprises a hydrophilic group selected from the group consisting of a carboxylic acid group, a hydroxyl group, and a sulfonic acid group.

8. The lithium battery of claim 1, wherein the second aqueous binder is different from the first aqueous binder.

9. The lithium battery of claim 1, wherein the second aqueous binder comprises at least one selected from the group consisting of styrene-butadiene rubber, acrylated styrene-butadiene rubber, acrylonitrile-butadiene rubber, acrylonitrile-butadiene-styrene rubber, acryl rubber, butyl rubber, fluorine rubber, polytetrafluoroethylene, polyethylene, polypropylene, ethylenepropylene copolymer, polyethylene oxide, polyvinylpyrrolidone, polyepichlorohydrin, polyphosphazene, polyacrylonitrile, polystyrene, ethylenepropylenediene copolymer, polyvinylpyridine, chlorosulfonated polyethylene, latex, a polyester resin, an acryl resin, a phenol resin, an epoxy resin, polyvinylalcohol, hydroxypropylmethylcellulose, hydroxypropylcellulose, and diacetylcellulose.

10. The lithium battery of claim 1, wherein the first aqueous binder and the second aqueous binder are present in the negative active material layer at a weight ratio in a range of 0.1:1 to 10:1.

11. The lithium battery of claim 10, wherein the first aqueous binder and the second aqueous binder are present in the negative active material layer at a weight ratio in a range of 0.25:1 to 10:1.

12. The lithium battery of claim 1, wherein the first aqueous binder is present in the negative active material layer in an amount in a range of 0.01 wt % to 10 wt %.

13. The lithium battery of claim 12, wherein the first aqueous binder is present in the negative active material layer in an amount in a range of 0.01 wt % to 5 wt %.

14. The lithium battery of claim 1, wherein the polymer layer comprises two layers, each polymer layer being on opposite surfaces of the base material layer.

15. The lithium battery of claim 1, wherein the base material layer is a porous film comprising a polyolefin material.

16. The lithium battery of claim 1, wherein the non-aqueous binder of the polymer layer comprises at least one selected from the group consisting of polyethylene, polypropylene, polyisobutylene, polyvinyl chloride, polyvinylidene chloride, polyvinylidene fluoride, polytetrafluoroethylene, polyvinyl acetate, polyvinylalcohol, polyvinylisobutylether, polyacrylonitrile, polymethacrylonitrile, methyl polymethacrylate, methyl polyacrylate, ethyl polymethacrylate, allyl acetate, polystyrene, polybutadiene, polyisoprene, polyoxymethylene, polyoxyethylene, poly cyclothioether, polydimethylsiloxane, polylactone, polyethyleneterephthalate, polycarbonate, nylon 6, nylon 66, poly-m-phenyleneisophthalamide, poly-p-phenyleneterephthalamide, and polypyromellitimide.

17. The lithium battery of claim 1, wherein the polymer layer has a thickness in a range of 0.1 μm to 10 μm.

18. The lithium battery of claim 1, wherein the positive electrode comprises a binder comprising a monomer unit identical to the monomer unit of the first aqueous binder of the negative electrode.

19. The lithium battery of claim 1, wherein the positive electrode comprises a binder identical to the non-aqueous binder of the separator.

20. The lithium battery of claim 1, wherein the positive electrode comprises a binder identical to the first aqueous binder of the negative electrode.

* * * * *